United States Patent Office 3,449,326
Patented June 10, 1969

3,449,326
PROCESS FOR PREPARING LACTAMS
Anthony N. Naglieri, Bronx, N.Y., and Charles N. Winnick, Teaneck, N.J., assignors to Halcon International, Inc., a corporation of Delaware
No Drawing. Filed Nov. 4, 1966, Ser. No. 591,981
Int. Cl. C07d 41/04, 41/00
U.S. Cl. 260—239.3                    9 Claims

ABSTRACT OF THE DISCLOSURE

This invention is directed to the preparation of lactams by reacting a nitrosyl halide or a precursor thereof with a cycloaliphatic hydrocarbon in vapor phase in the presence of a solid acidic catalyst.

---

The present invention relates to lactams and more particularly it relates to the production of lactams by reacting nitrosyl halide or a precursor thereof with a cycloaliphatic hydrocarbon in the presence of an acidic catalyst.

Lactams, e.g., caprolactam, are exceedingly important raw materials for a number of commercial applications, among which is the production of polyamide-type polymers. Nylon 6 is an example of such a polymer. Known processes for the production of lactams from cycloaliphatic hydrocarbons involve multi-step reactions. For example, one such process involves (1) oxidation of a cycloaliphatic hydrocarbon to a cycloketone, (2) reaction of the cycloketone with hydroxylamine to form an oxime, and (3) Beckmann rearrangement of the oxime to lactam. Another such process involves photolysis of a reaction mixture of a cycloaliphatic hydrocarbon and nitrosyl chloride to give the corresponding oxime, followed by Beckmann rearrangement of the oxime to lactam.

The known processes for preparing lactams from cycloaliphatic hydrocarbons involve multiple chemical processes and operations, which necessitate large capital investments in plant and equipment. It would be a notable advance in this field if the numerous steps required by the prior art processes could be eliminated.

Accordingly, it is an object of the present invention to provide a new and improved process for the preparation of a lactam from a cycloaliphatic hydrocarbon. Another object is to provide a process for the direct preparation of a lactam from a cycloaliphatic hydrocarbon. A further object is to provide a catalyst for the one step preparation of a lactam from a cycloaliphatic hydrocarbon. These and other objects of the present invention will become apparent from the following description.

It has been found that a lactam may be produced directly from a cycloaliphatic hydrocarbon in one step by contacting at elevated temperatures in vapor phase a cycloaliphatic hydrocarbon with a nitrosyl halide or precursor thereof in the presence of an acidic catalyst. The lactam is obtained as a major product along with some cycloalkanone oxime as a co-product. The cycloalkanone oxime may, of course, itself be converted to lactam by known means, for example, by Beckmann rearrangement, thereby increasing the overall yield of lactam from the process. Caprolactam may be directly produced in one step from cyclohexane according to the present process by contacting at elevated temperatures cyclohexane with a nitrosyl halide or precursor thereof in the presence of an acidic catalyst.

The cycloaliphatic hydrocarbon may contain from 5 to 12 carbon atoms. Examples of suitable cycloaliphatic hydrocarbons are cyclopentane, cyclohexane, cycloheptane, cyclooctane and cyclododecane.

The reaction between the cycloaliphatic hydrocarbon and the nitrosyl halide or precursor thereof is carried out at elevated temperatures of from about 275° C. to about 450° C., preferably from about 325° C. to about 400° C. The cycloaliphatic hydrocarbon is present in an excess relative to the nitrosyl halide or precursor thereof. The ratio of cycloaliphatic hydrocarbon to nitrosyl halide or precursor thereof may be from about 10–100:1, preferably from about 25–50:1. The nitrosyl halide may consist of nitrosyl chloride or nitrosyl bromide, or mixtures thereof. In addition, nitrosyl halide precursors may be employed, for example, mixtures of nitric oxide and chlorine, or mixtures of nitric oxide and bromine or mixtures of nitric oxide and both chlorine and bromine. Other nitrosyl halide precursors may be employed, for example, mixtures of nitric oxide and nitrogen dioxide plus hydrogen halide, or mixtures of nitric oxide, hydrochloric acid and free halogen. In general, any reactants which form nitrosyl halide may be employed. It is also possible to employ mixtures of nitrosyl halide or precursors thereof with excess hydrogen halide or with excess nitric oxide. For example, nitrosyl halide containing up to 10 mols of hydrogen halide per mol of nitrosyl halide may be employed. Similarly, the nitrosyl halide may contain up to 30 mols of nitric oxide, preferably from about 2 to about 10 mols per mol of nitrosyl halide. Preferably, the nitric oxide is present in excess quantity.

The reaction is carried out in the presence of an acidic metallic oxide catalyst. Examples of suitable metallic oxides are alumina, silica, silica-alumina, thoria, boric oxide or acid phosphates.

The reaction is carried out by passing the mixture of cyclohexane and nitrosyl halide or a precursor thereof, over the acidic catalyst at a space velocity of from about 25 to about 2500 hour$^{-1}$, preferably at space velocities of from about 100 to about 1000 hour$^{-1}$.

The following examples illustrate the present invention without, however, limiting the same thereto.

EXAMPLE I

Cyclohexane at a rate of 282 cc. of liquid/hr., nitric oxide at a rate of 13 liter/hr. and chlorine at a rate of 1.6 liter/hr. are passed over 80 cc. of the catalyst consisting of Filtros (pure $SiO_2$) impregnated with 16.6% boric acid which has been calcined at 500° C. The catalyst is contained in a glass reactor (15 mm. x 900 mm.) at 350° C. The products are recovered in an ice trap and unreacted nitrosyl chloride is absorbed in concentrated sulfuric acid.

The conversion of NOCl is about 70% with a selectivity, based on NOCl, to caprolactam of 24 wt. percent.

EXAMPLE II

Cyclohexane, hydrochloric acid, nitric oxide and chlorine in the amounts of 2.6, 0.3, 0.5, and 0.07 mol, respectively, are reacted in vapor phase at 375° C. in a glass reactor, over alumina impregnated with 10% boric oxide. The caprolactam selectivity is about 18 wt. percent at an NOCl conversion of 87%.

EXAMPLE III

Employing NOBr instead of $Cl_2$ and NO as in Example I, results in caprolactam selectivities of 32 wt. percent at almost total NOBr conversion.

EXAMPLE IV

The same feed as in Example I is passed over alumina (surface area=0.5 m.$^2$/gm.). The conversion of NOCl is about 65% with a selectivity, based on NOCl, to caprolactam of 6 wt. percent.

What is claimed is:

1. A process for preparing a lactam which comprises contacting a cycloaliphatic hydrocarbon containing from 5 to 12 carbon atoms and a nitrosyl halide, or a precursor thereof, in vapor phase in the presence of an acidic metallic oxide catalyst selected from the group consisting of alumina, silica, silica-alumina, thoria, boric oxide and acid phosphates.

2. A process according to claim 1 wherein the cycloaliphatic hydrocarbon is present in an amount of from about 10 to about 100 parts by weight per part by weight of nitrosyl halide or precursor thereof.

3. A process according to claim 1 wherein the contacting takes place at temperatures of from about 275° C. to about 450° C.

4. A process according to claim 1 wherein the nitrosyl halide is nitrosyl chloride or a precursor thereof.

5. A process according to claim 1 wherein the catalyst is supported.

6. A process according to claim 5 wherein the supported catalyst is boric oxide.

7. A process according to claim 1 wherein the cycloaliphatic hydrocarbon is cyclohexane.

8. A process according to claim 2 wherein the cycloaliphatic hydrocarbon is present in an amount of from about 25 to about 50 parts by weight per part by weight of nitrosyl halide or precursor thereof.

9. A process according to claim 8 wherein the cycloaliphatic hydrocarbon is cyclohexane and wherein the catalyst is boric oxide.

References Cited

UNITED STATES PATENTS 3,090,739   5/1963   Ito _____ 260—239.3

HENRY R. JILES, *Primary Examiner.*

R. T. BOND, *Assistant Examiner.*

U.S. Cl. X.R.

252—432, 435, 449, 454, 455, 462, 463; 260—294.7